United States Patent Office 2,926,299
Patented Feb. 23, 1960

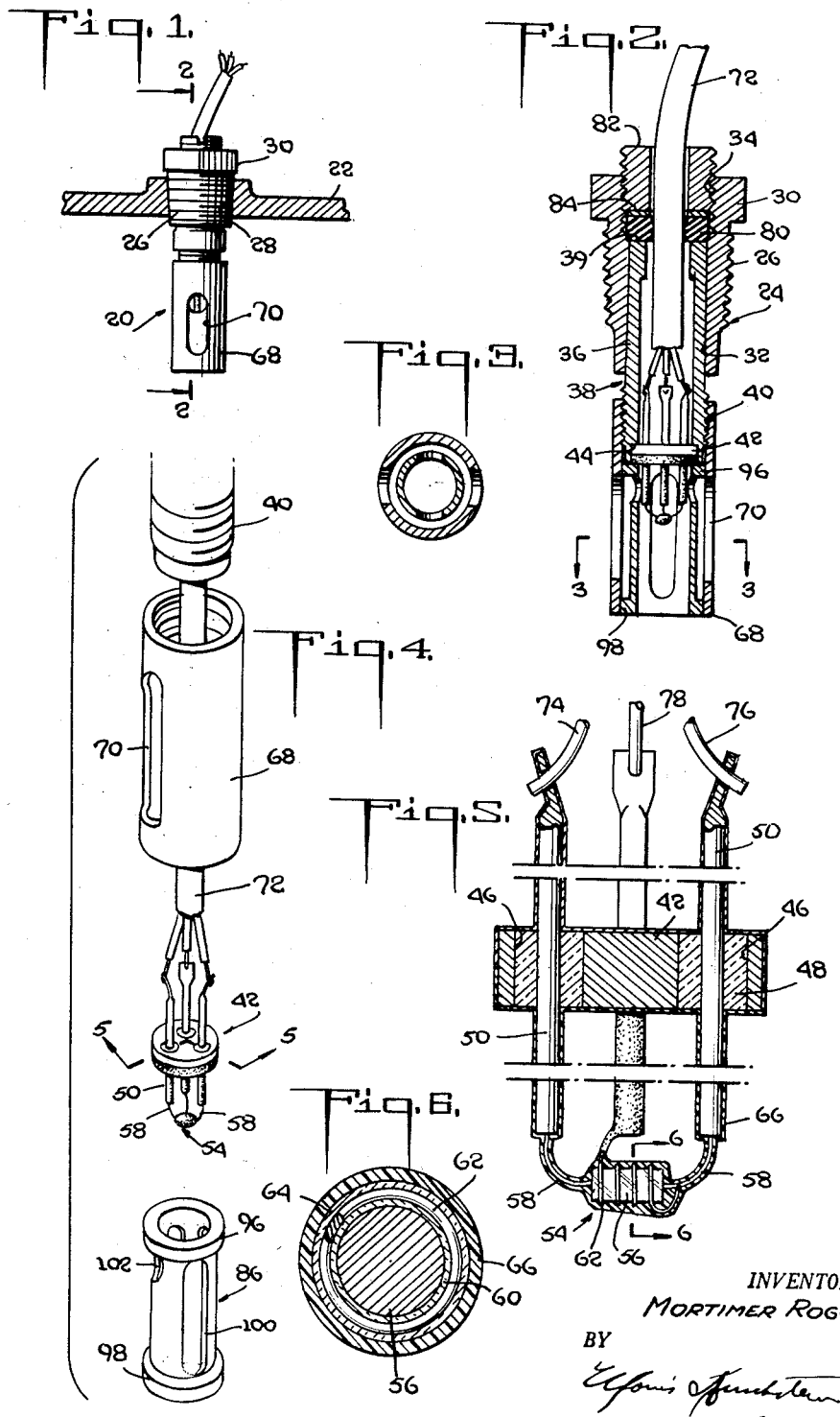

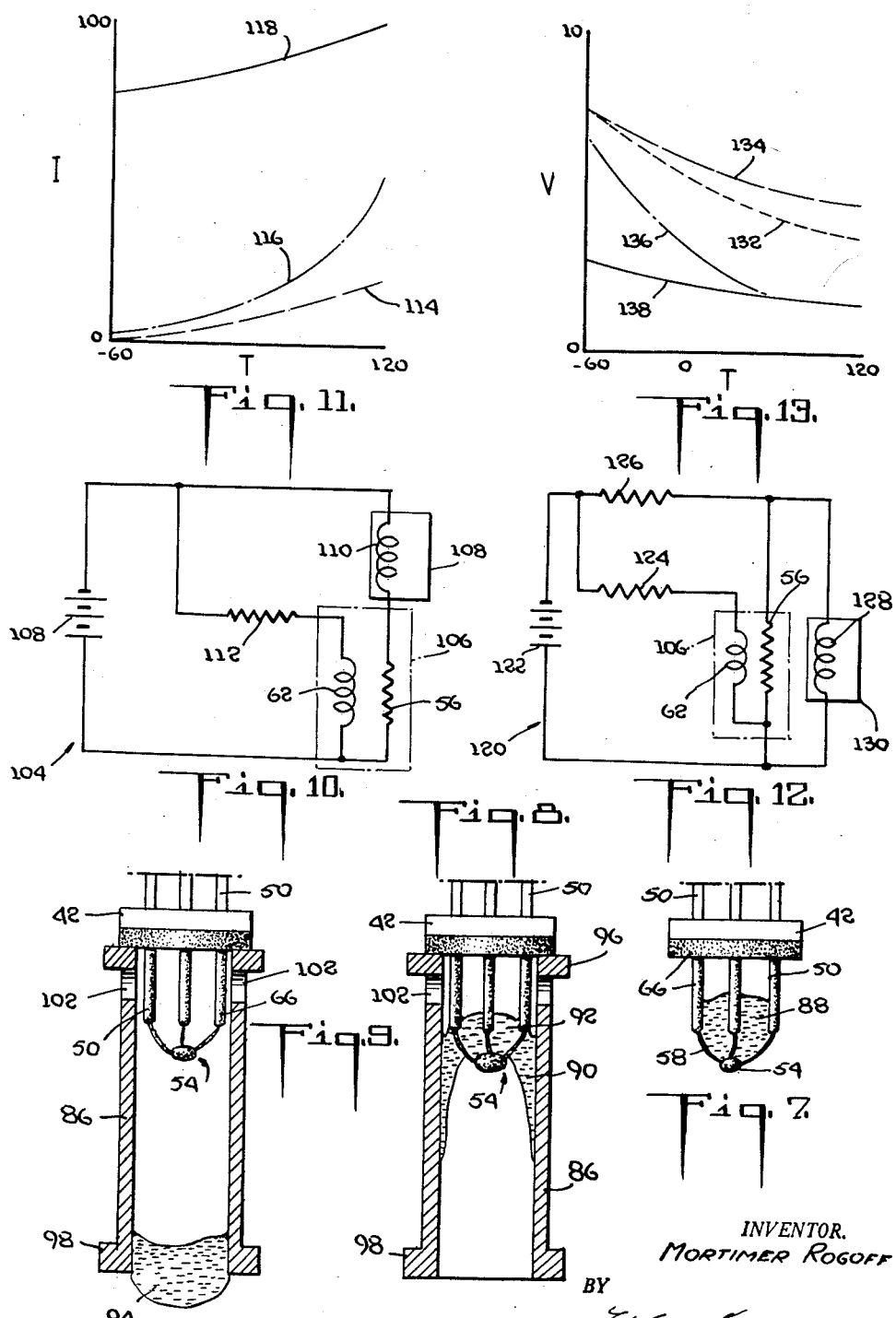

2,926,299

ELECTRICAL INSTRUMENT WITH THERMISTOR SENSING ELEMENT

Mortimer Rogoff, Nutley, N.J., assignor to McDermott Controls, Inc., East Orange, N.J., a corporation of New Jersey Application April 21, 1954, Serial No. 424,705

5 Claims. (Cl. 323—68)

This invention relates to an electrical instrument with a thermistor sensing element.

As is well known, a thermistor is an electrical resistance which is highly sensitive to changes in temperature, i.e., it has a very large temperature coefficient of resistance, the coefficient being negative so that as the temperature of the thermistor goes up its resistance goes down, and vice versa.

The present invention is concerned with the use of a thermistor in an electric circuit and a physical location such that an electrical indication is furnished of a change in the heat dissipating characteristics of ambient fluid media in which the thermistor is disposed. For example, the thermistor will furnish an electrical indication when the ambient fluid medium changes from liquid to gas, or vice versa, or when the ambient fluid medium changes from a static to a kinetic condition, or vice versa.

The thermistor is able to function in the foregoing manner because as the medium while remaining at a constant temperature experiences a change that alters its heat dissipating characteristic the temperature of the thermistor will vary. The temperature change is caused by different rates of dissipation of the heat generated internally of the thermistor by the measuring current. This heat is dissipated more rapidly in a liquid than in a gas and more rapidly in a moving fluid medium than in a stationary fluid medium. Hence a thermistor in water will reach an equilibrium temperature lower than that of the same thermistor in air, etc.

Since it inherently is a temperature-responsive device, a thermistor although it will operate for the purpose described in a constant temperature medium is affected by fluctuations in ambient temperature. This makes the thermistor difficult to use where the ambient temperature varies widely. A circuit for overcoming this difficulty is shown in my copending application Serial No. 374,091, filed August 13, 1953, for Electrical Instruments. Said circuit affords a considerable increase in the range of ambient temperatures over which the thermistor may be employed for certain detection of a change in the heat dissipating characteristics of a surrounding fluid medium. Nevertheless, even with the circuit it is not possible to use a thermistor where very low ambient temperatures, e.g., as low as −40° F. are expected to be reached. Without the circuit, detection of a change in the heat dissipating characteristic is not certain at higher temperatures.

When a thermistor is severely chilled, as for example when it is immersed in an extremely cold liquid, and thereafter is withdrawn into air, or where the thermistor is left idle for a considerable period of time in extremely cold air, and current thereupon is passed through the thermistor, it will be appreciated that the resistance of the thermistor is very high and the amount of current flowing through the thermistor is minute, so that not only are the equilibrium temperatures for liquid and fluid almost the same, and therefore unusuable for distinguishing between different heat dissipating characteristics, but the times required to reach such temperatures are fairly long.

It is an object of my present invention to provide a thermistor-controlled electrical instrument which is not subject to any of the foregoing drawbacks.

It is another object of my invention to provide an instrument of the character described which operates efficiently, rapidly and accurately at low temperatures.

It is an additional object of my invention to provide an instrument of the character described utilizing an auxiliary source of heat, so as in a measure to be independent of local low temperatures.

It is a further object of my invention to provide an instrument of the character described which is arranged to increase the normal spread between equilibrium temperatures of a thermistor in two iso-thermal fluid media having different heat dissipating characteristics.

It is still another object of my invention to provide an electrical instrument of the character described which constitutes relatively few parts and is easy and inexpensive to make and maintain.

It is yet another object of my invention to provide an instrument of the character described which is rugged in construction and reliable in operation.

As will be understood from the foregoing the rapidity with which the instrument furnishes an indication of a change in the heat dissipating characteristics of a surrounding fluid medium, often is a critical factor, and, indeed, the improvement hereinabove alluded to is concerned inter alia with increasing the speed of response, particularly under cold temperature conditions. The speed of response also is affected when the change of ambient media is from liquid to gas by the presence of a residual body of liquid in good thermal relationship with the thermistor. Such a body, until evaporated, will cause the thermistor to act as though immersed in liquid. Hence, response is delayed until the body is boiled off by the self-heat of the thermistor. Under low temperature conditions this additional time can be intolerable.

It is an ancillary object of my invention to provide a thermistor-controlled instrument of the character described having a probe which is so constructed as to rapidly drain fluid from the sensing thermistor and its immediate vicinity.

Other objects of my invention in part will be obvious and in part will be pointed out hereinafter.

My invention accordingly consists in the features of construction, combinations of elements and arrangements of parts which will be exemplified in the instruments hereinafter described and of which the scope of application will be indicated in the appended claims.

In the accompanying drawings in which are shown various possible embodiments of my invention, Fig. 1 is an elevational view of an operatively mounted thermistor probe constructed in accordance with the present invention;

Fig. 2 is an enlarged longitudinal section view through the probe, the same being taken substantially along the line 2—2 of Fig. 1;

Fig. 3 is a sectional view taken substantially along the line 3—3 of Fig. 2;

Fig. 4 is an exploded perspective view of the probe;

Fig. 5 is an enlarged sectional view taken substantially along the line 5—5 of Fig. 4 and illustrating in detail the thermistor sensing element and the lead wires and mounting disc therefor;

Fig. 6 is an enlarged sectional view taken substantially along the line 6—6 of Fig. 5;

Fig. 7 is an elevational view of the thermistor sensing element, lead wires and mounting disc after being raised from a liquid;

Fig. 8 is an elevational view of the thermistor, lead wires, mounting disc and a draining sleeve immediately after being raised from a liquid;

Fig. 9 is a view similar to Fig. 8, but showing the parts a fraction of a second later;

Fig. 10 is an electric circuit showing the wiring diagram of an electrical instrument utilizing the aforesaid thermistor probe;

Fig. 11 is a comparative graph of thermistor current vs. ambient fluid temperature in instruments with and without the present invention;

Fig. 12 is an electric circuit showing the wiring diagram of an electrical instrument embodying a modified form of my invention;

Fig. 13 is a comparative graph illustrating thermistor voltage vs. ambient fluid temperature in an instrument embodying the circuit of Fig. 12 and a similar instrument without the benefit thereof.

In general I carry out my invention with the aid of a thermistor adapted to be located physically in a fluid and having in proximity thereto and preferably in good thermal relationship therewith a low wattage heater which is in good thermal relationship with the ambient fluid. Both the thermistor and heater are supplied with electrical energy. The amount of energy generated in the heater is quite small, so that it will be dissipated rapidly when the ambient fluid has a high coefficient of heat conductivity, e.g., when the ambient fluid is water, or in motion. Under such conditions the heat emanating from the heater will not appreciably increase the temperature of the thermistor. However, when the abient fluid is quiescent and gaseous, dissipation is much less rapid so that the heat supplied by the heater will appreciably raise the temperature of the thermistor and thereby lower its resistance. The thermistor can be supplied with a substantially constant current or a substantially constant voltage or both the current and voltage may fluctuate with fluctuations in the resistance of the thermistor.

Referring now in detail to the drawings, and more particularly to Figs. 1 through 6, the reference numeral 20 denotes a probe constructed in accordance with my present invention. Said probe is adapted to be mounted in a vessel that contains a fluid. Typical vessels are reservoirs, tanks, and pipes. In one form of the invention the fluid in which the probe is designed to be placed varies from gaseous to liquid, the thermistor being arranged to furnish an indication of a change in state of the fluid from gas to liquid, or vice versa. By way of illustration I have shown the probe mounted in the top wall of a tank 22 so as to indicate when the tank is full.

The probe 20 includes a bushing 24 having an externally threaded shank 26 which is designed to be screwed into a tapped opening, as for example the hole 28 in the top of the tank 22. The outer end of the bushing is formed with a polygonal flange 30 for engagement by an instrument such as a wrench to tighten the probe in place. The lower portion 32 of the bore of the bushing flares downwardly at a slight angle. The upper portion 34 of said bore is fashioned with a female thread. Said lower portion 32 frictionally receives the tapered shank 36 of a nipple 38. It will be observed that the upper end of the nipple forms a seat 39. The lower end of the nipple is provided with a male threaded portion 40.

To support the thermistor I provide a mounting disc 42, which in the probe shown herein is metal, e.g. steel. Said disc is received in a recessed seat 44 formed in the lower end of the nipple 38, the seat being of the proper depth to locate the outer surface of the disc flush with the lower end of the nipple. Optionally to hermetically seal the lower end of the nipple, the upper surface and adjacent portion of the periphery of the disc are tinned and after assembly of the probe a mild heat is applied to liquefy the tinning alloy and thereby solder the same to the nipple.

The disc is pierced by three equiangularly disposed vertical openings 46, each of which is plugged by a glass sleeve 48. Said sleeves serve to locate and hold metal lead mounts 50 extending above and below the disc. The upwardly extending portions of the lead mounts are tinned to facilitate connection in the circuit for the electrical instrument.

The downwardly extending portions of the lead mounts function as a carrier for the sensing element 54. Said sensing element includes a conventional thermistor 56 which, as is usual, is an electrical resistance that is particularly sensitive to changes in temperature, having a negative temperature coefficient of resistance of appreciable magnitude. By way of example and without in any way limiting my invention thereto the thermistor may constitute a cylinder approximately 0.04 of an inch in diameter and 0.08 of an inch long.

Extending from spaced points of the thermistor are wires 58 which are connected to two different lead mounts 50.

The thermistor and optionally the adjoining portions of the wires 58 are covered with a thin film 60 of insulating material, a satisfactory substance being glass. Said film is made very thin so that heat will pass therethrough readily.

Wound around the film covering the thermistor is a coil 62 of fine resistance wire, a satisfactory diameter therefor being 0.003 inch. A satisfactory wattage for the coil is 0.1 of a watt. The coil is fixed in placed with a very thin film 64 of an insulating substance. For this purpose I likewise may employ glass, the outer film being approximately of the same thickness as the inner film, i.e., about 0.004 inch.

Attention is called to the fact that the outer film is kept quite thin in order that heat may be dissipated outwardly with ease so that when submerged in a fluid which is a good conductor of heat, the heat energy liberated by the coil will in the main be released to the ambient medium and will not appreciably raise the temperature of the thermistor.

Desirably, in order to segregate the electrical components of the probe from the surrounding media and to make certain that if the protective film 64 covering the coil is broken no damage will be done, I enrobe the probe, the wires, the lead mounts and the lower surface of the mounting disc with a thin layer 66 of synthetic plastic, e.g., a layer 0.006 inch thick. For this purpose I prefer to employ a synthetic plastic which has good physical resistance to high temperatures and preferably one which is relatively non-wettable. I have found that polytetrafluoroethylene (sold under the trademark "Teflon") is highly satisfactory. Another suitable plastic is polychlorotrifluoroethylene. Said plastics are suitably applied to the parts to be covered, as by dipping or spraying.

One end of the heating coil is connected to one of the wires 58 and the other end to one of the lead mounts 50 so that the heating coil and thermistor are in parallel. This arrangement enables me to employ a minimum number of lead mounts 50. It will be appreciated however that it is within the ambit of the present case to use four lead mounts so that the coil can be connected in circuit as desired. Such an arrangement will enable me to employ any circuit that may be desired for the electrical instrument.

It should be observed that the glass layers 60, 64 are employed principally for fixing the turns of the heating coil in place and they therefore can be replaced by any other suitable insulating material. In such an event care must be exercised to select a substance that is not deleteriously affected by the high temperature to which the coil is raised during operation particularly when the probe is in a relatively poor heat dissipating medium.

The sensing element and its support are protected by a shielding sleeve 68 having a female threaded portion at its upper end designed to mesh with the male threaded portion 40 of the nipple. The sleeve extends around and projects well below the sensing element. To permit venting of the sleeve and access of fluid to the sensing element the sleeve is formed with frictionally elongated slots 70. The shield also functions to keep spray off the sensing element while the vessel 22 is being filled.

A cable 72 connects the sensing element in circuit. As shown herein the cable includes three leads 74, 76, 78. The cable extends through the bushing 24 into the nipple 36, the bare ends of the leads 74, 76, 78 being respectively connected, as by soldering, to the lead mount which carries current to the thermistor, the lead mount which carries current to both the thermistor and the heating coil and the lead mount which carries current to the heating coil.

Hermetic sealing of the cable is insured by an elastomeric gasket 80 which rests on the seat 39. The gasket encircles the cable and is constructed thereon under compression by a hollow internal nut 82 which is threaded into the bushing 24. Twisting of the gasket is prevented by a metal washer 84 interposed between the nut and gasket.

I have found that due to the close spacing of the lead mounts, wires and sensing element there is a marked tendency for liquid to cling to the parts and remain in the spaces therebetween when the probe is withdrawn from liquid. The distances involved are so small that the strength of a liquid film extending between these parts is sufficient to support the weight of a tiny body of liquid located therebetween. As long as any liquid is in contact with the sensing element the heat generated by the heating coil is absorbed by the liquid substantially as rapidly as if the sensing element were submerged in liquid. This condition persists as long as the liquid remains, that is, until the liquid is evaporated by heat supplied from the coil and the thermistor. Thus a time lag is introduced between the actual withdrawal of the sensing element from liquid and the establishment of a new higher equilibrium temperature indicating that such withdrawal has taken place.

I overcome the foregoing difficulty by providing a draining element in the form of a tube 86, the internal surface of which is such that it is wetted by the liquid employed, i.e., has an angle of contact less than 90 degrees. The tube surrounds the sensing element and its support and extends below the same. To the end the tube is telescopically received within the shield 68 and is coaxial therewith. The space between the internal surface of the tube and each lead mount is less than the space between any pair of lead mounts and, preferably, less than the space between any pair of wires 58. It should be noted that this relationship is not critical; it is, however, necessary for the space between the internal surface of the tube and each lead mount to be small enough for the strength of a water film extending between a lead mount and the tube to be sufficient to support a tiny body of water above te same. A satisfactory distance is about 0.010 inch. When such spacing is employed the probe upon withdrawal from liquid will have a tiny body of liquid between the lead mounts and the tube. Since the internal surface of the tube is wettable by the liquid this body will run down the tube. As it does so, it will, through the force of cohesion, bring with it the liquid remaining between the lead mounts, wires and sensing element.

The improvement effectuated by the draining tube is best shown by comparison of Figs. 7, 8 and 9. In Fig. 7 I have shown the lead mounts 50, wires 58 and sensing element 54 (but no draining tube) as they appear after withdrawal from liquid. It will be seen that a tiny body 88 of residual liquid clings to these closely spaced parts of the probe and remains in contact with the sensing element where it exerts the effect above described.

In Fig. 8 I have shown the same parts within the draining tube 86 as they appear immediately after withdrawal from a liquid. Attention is called to the body 90 of liquid which has formed between the lead mounts and internal surface of the tube and has started to run down the internal surface of the tube, pulling with it the tiny body 92 of liquid which remained between the lead mounts, wires and sensing element.

In Fig. 9 I have shown the final disposition of the residual liquid which accumulates as a drop 94 at the open bottom end of the tube leaving the sensing element dry. The time required to drain the residual liquid in the above manner is a fraction of a second so that there is not noticeable time lag arising from such cause.

For holding the draining tube in proper position in the sleeve 68, the upper and lower ends of the tube are enlarged to form spacing collars 96 and 98, which are designed to engage the internal surface of the sleeve. Vertically elongated slots 100 in the sides of the draining tube permit free access of liquid to the sensing element. The slots 100 are angularly spaced from the slots 70 so as better to intercept any spray.

I have noticed that with certain liquids and under certain temperature conditions there is a tendency to form vapor bubbles which coalesce in the presence of objects located within the liquid. This causes a gas bubble to form under the disc 42. To prevent this bubble from becoming sufficiently big to envelope the sensing element and preclude contact with liquid which actually surrounds the probe, I provide venting apertures 102 in the sides of the draining tube between the slots 100. These apertures, and preferably the upper ends of the slots 100, are located well above the sensing element. Due to such arrangement the apertures 102 are in line with the upper ends of the slots 70 in the shielding sleeve. However, since said slots are out of registry with the sensing element, interference by spray is substantially negligible.

The circuit for an electrical instrument 104 embodying my invention is shown in Fig. 10. Said instrument includes the probe 20, the electrical elements of which are within the dot-and-dash rectangle 106 of Fig. 10. In addition, the instrument includes a source of electrical energy such as a battery 108 which furnishes measuring current for the thermistor 56 and energizing current for the heating coil 62. The instrument also includes an electrical device such as a relay 108 having a predetermined threshold operating power.

In the instrument 104 shown in Fig. 10 the operating coil 110 of the relay is connected in series with the thermistor 56. The heating coil 62 is connected in shunt across the thermistor and relay operating coil. In order to limit the amount of current flowing through the heating coil a resistance 112 is connected in series with said coil. The relay 108 is a current-sensitive relay, that is to say, it will close when a certain current is passing therethrough and will open when a certain lesser current is passing therethrough.

I refer to the type of circuit just described as a constant voltage circuit, since the resistance of the operating coil 110 is of a magnitude in the order of or less than that of the thermistor 56 in gas at the lowest expected temperature so that as the resistance of the thermistor fluctuates the current flowing through it and through the operating coil will vary while the voltage drop across the thermistor remains substantially constant.

In order to illustrate graphically the improvement resulting from the use of the heating coil in Fig. 11 I have illustrated on a single chart comparative temperature-current curves for an instrument employing the probe 20 and for an instrument with the same probe except for the heating coil. The dash line 114 represents the temperature-current curve of the thermistor 56 (without a heating coil) under constant voltage conditions with the thermistor immersed in liquid. The dot-and-dash line 116 represents the corresponding curve for said thermistor in air. It will be noted that these two curves are very close to one another, particularly at low temperatures, so that a variation in current through the thermistor cannot be trusted as a reliable indication of change in ambient media from liquid to gas or vice versa. The variation is just as likely to be caused by a change in temperature of the media.

The line 114 also represents the temperature-current liquid curve of the thermistor 56 in a probe embodying the present invention, that is to say, a probe which includes a heating coil 62. These two curves, that is, the liquid curves for thermistors with and without an auxiliary heating coil, are not noticeably different due to the effect of the extremely high heat dissipation characteristics of liquid on a thermistor in which the heating coil is in good thermal conductivity with the ambient medium.

The solid line 118 represents the temperature-current curve of the thermistor 56 with the auxiliary heating coil 62 when the thermistor is in gas. It will be observed that the curve 118 is markedly spaced from the air curve 116 of a thermistor without a heating coil and from the liquid curve of the thermistor-heating coil combination so that the thermistor is substantially insensitive to temperature changes and in particular is substantially unaffected by low temperatures.

It will be noted that the energy supplied to and by the heating coil remains substantially constant since the voltage is constant, since the current limiting resistance 112 is outside the probe and since the resistance of the heating coil 56 in the probe has a small temperature coefficient of resistance. It is, however, within the scope of my invention to permit the energy fed to the coil to be varied somewhat, so as, for example, to raise the low temperature end of the current-temperature air curve, it being understood any fluctuations in energy radiated by the heating coil are of a very low frequency, the period of which will be measured in hours.

Attention is drawn to the fact that the amount of energy radiated by the heating coil is substantial, even at low temperatures, so that the instrument has a fast response over a large range of temperatures.

In Fig. 12 I have shown a different electrical instrument 120 embodying a modified form of my invention. In this instrument the components are such that either a substantially constant current is applied to the thermistor or so that both the voltage and current applied to the thermistor are varied. Said instrument 120 includes the thermistor 56 and heating coil 62 which are enclosed in a dot-and-dash rectangle 106 to indicate that these parts are contained within the probe 20.

The instrument is powered from a source of electrical energy such as a battery 122. Energy is applied to the heating coil from the battery through a current limiting resistance 124. Energy is supplied to the thermistor through a resistance 126. The series circuit including the heating coil 62 and resistance 124 are in shunt with the series circuit including the thermistor 56 and resistance 126. A relay circuit is in shunt with the thermistor. This circuit includes the operating coil 128 of a voltage-sensitive relay 130.

If the resistance 126 is sufficiently high to impose substantially constant current conditions on the thermistor 56, that is to say, if the order of magnitude of resistance 126 is of a greater order than the order of magnitude of the effective resistance of the two shunt connected components, i.e., the thermistor 56 and operating coil 128, I refer to the instrument as a constant current instrument. If the order of the resistance 126 is the same as the order of the effective resistance of the aforesaid two shunt connected components, both the current and voltage applied to the thermistor will fluctuate and I refer to the instrument as a variable current and voltage instrument.

In Fig. 13 I have shown graphically the operating conditions for the instrument 120 as a constant current instrument and as a variable current and voltage instrument in comparison with operation of a similar instrument without a heating coil. The dotted line 132 represents the voltage-temperature curve of the thermistor 56 in liquid, regardless of the absence or presence of the heating coil 62 and under constant current conditions. The long dash line 134 represents the voltage-temperature curve of the thermistor 56 in liquid regardless of the presence or absence of the heating coil 62 and under variable voltage and current conditions. The dot-and-dash line 136 represents the voltage-temperature curve of the thermistor 56 in air where the auxiliary heating coil 62 is not employed and regardless of whether the instrument operates under constant current conditions or under variable current and voltage conditions. The solid line 138 represents the voltage-temperature curve of the thermistor 56 in air where the auxiliary heating coil 62 is employed and regardless of whether the instrument operates under constant current conditions or under variable current and voltage conditions.

It will be observed that from approximately 0° F. up, temperature variations do not exert too great an effect on the reliability of the instrument for indicating changes in heat dissipating characteristics of the ambient medium. It is for this reason that such a circuit, which is the subject of my aforesaid copending application is useful under ordinary conditions. Nevertheless, under very low temperature conditions, it will be seen that the curve 136 approaches both curves 132, 134 so that under such conditions the instrument no longer will furnish a reliable indication of changes in heat dissipating characteristics. The curve 138, however, is spaced substantially from the curves 132, 134 even at low temperatures whereby to give a reliable indication of change in heat dissipating characteristics even under very low temperature conditions.

It thus will be seen that there are provided instruments which achieve all the objects of my invention and are well adapted to meet the conditions of practical use.

As various possible embodiments might be made of the above invention, and as various changes might be made in the embodiments above set forth, it is to be understood that all matter herein described, or shown in the accompanying drawings, is to be interpreted as illustrative and not in a limiting sense.

Having thus described my invention, I claim as new and desire to secure by Letters Patent:

1. An electrical instrument adapted to be physically located for exposure to a liquid or a gas, said instrument including an element for sensing differences in heat dissipating characteristics and adapted to be immersed in a liquid and withdrawn therefrom, a plurality of closely spaced elements for supporting said sensing element, said sensing element being insensitive to the presence of gas as long as it is in contact with liquid, and said supporting elements being so closely spaced that they tend to retain residual liquid therebetween when withdrawn from liquid, and a draining sleeve surrounding said sensing element and supporting elements and in close proximity thereto said sleeve being in such close proximity to the supporting elements that residual liquid will bridge the gap between said sleeve and elements, said draining sleeve extending below said elements, the internal surface of the sleeve being wettable by the liquid, said sleeve having an opening below and an opening above the sensing element.

2. An electrical instrument for determining in which of two media having different heat dissipating characteristics an element for sensing differences in heat dissipating characteristics and is located, said element comprising a thermistor, an auxiliary heating means intimately associated with said thermistor in proximity thereto and in good thermal conductive relationship with the ambient media, lead mounts for supporting said thermistor and heating means, said lead mounts being closely spaced and thereby tending to retain liquid between them when withdrawn from liquid, and a draining sleeve surrounding said lead mounts and extending below said mounts and said sleeve being in close proximity to said lead mounts, said sleeve being in such close proximity to the lead mounts that residual liquid will bridge the gap between said sleeve and mounts, the internal surface of the sleeve being wettable by the liquid, said sleeve having an opening below and an opening above the sensing element.

3. An electrical instrument for determining in which of two media having different heat dissipating characteristics an element for sensing differences in heat dissipating characteristics and is located, said element comprising a thermistor, lead mounts for supporting said thermistor, said lead mounts being closely spaced and thereby tending to retain liquid between them when withdrawn from liquid, and a draining sleeve surrounding said lead mounts and extending below said mounts and said sleeve being in close proximity to said lead mounts, said sleeve being in such close proximity to the lead mounts that residual liquid will bridge the gap between said sleeve and mounts, the internal surface of the sleeve being wettable by the liquid, said sleeve having an opening below and an opening above the sensing element.

4. An electrical instrument for indicating in the vicinity of a thermistor a change from gaseous to liquid state or a change from static condition to a predetermined velocity of flow of a fluid medium: said instrument comprising a thermistor and an associated circuit, said thermistor being adapted to be located in the fluid medium and to operate at a temperature higher than the temperature of the medium, means to apply a constant voltage to the thermistor and its associated circuit and an auxiliary electric heating means intimately associated with said thermistor in proximity thereto and in good thermal conductive relationship with said thermistor and the ambient media, said heating means being included in said associated circuit, said thermistor and heating means being so relatively proportioned that at the low temperature end of the useful range of operation of the instrument the temperature of the thermistor in a poor heat conductive medium such as a gaseous medium or a static fluid medium is substantially greater than the temperature of the ambient medium and is substantially insensible to changes in ambient temperature, the temperature of the thermistor being raised by the auxiliary heating means when in such a poor heat conductive medium to a temperature at which it experiences a subsequent heating rise to a temperature greater than that imparted to it by the heater.

5. An electrical instrument as set forth in claim 4 wherein the auxiliary heating means constitutes a coil closely wrapped about the thermistor.

References Cited in the file of this patent

UNITED STATES PATENTS

| | | |
|---|---|---|
| 1,156,638 | Simmons | Oct. 12, 1915 |
| 2,326,884 | Phelps | Aug. 17, 1943 |
| 2,396,196 | Pearson | Mar. 5, 1946 |
| 2,423,107 | McUhirter et al. | July 1, 1947 |
| 2,471,457 | Shepard | May 31, 1949 |
| 2,533,287 | Schmitt | Dec. 12, 1950 |
| 2,580,016 | Gilbert | Dec. 25, 1951 |
| 2,580,182 | Morgan | Dec. 25, 1951 |
| 2,616,949 | Cade | Nov. 4, 1952 |
| 2,651,699 | Jacobsen et al. | Sept. 8, 1953 |
| 2,667,178 | Fred et al. | Jan. 26, 1954 |
| 2,673,917 | Woodling | Mar. 30, 1954 |

OTHER REFERENCES

Pearson: Bell Laboratories Record, December 1940, pp. 107, 108, 109.

Penman et al.: Journal of Scientific Instruments, vol. 26, March 1949, pp. 77–80.